United States Patent Office 3,436,370
Patented Apr. 1, 1969

3,436,370
UNSATURATED ETHYLENE-PROPYLENE RUBBERS STABILIZED WITH N,N-SUBSTITUTED DIAMINES
Harald Blumel, Marl, Germany, assignor to Chemische Werke Huls A.G., Marl, Germany
No Drawing. Continuation-in-part of application Ser. No. 495,695, Oct. 13, 1965. This application Oct. 11, 1966, Ser. No. 585,776
Claims priority, application Germany, Oct. 16, 1964, C 34,115; Oct. 12, 1965, C 37,125, C 37,126
Int. Cl. C08f 45/60
U.S. Cl. 260—45.9                             12 Claims

ABSTRACT OF THE DISCLOSURE

For stabilizing and preventing crack growth in unsaturated ethylene/propylene vulcanized rubbers, the use of a stabilizing agent of the formula:

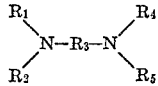

wherein
$R_1$ and $R_2$ each represents alkyl, or hydroxyalkyl of 1–16 carbon atoms,
$R_3$ represents alkylene of 1–16 carbon atoms, and
$R_4$ and $R_5$ each represents hydrogen, alkyl of 1–16 carbon atoms, or hydroxyalkyl of 1–16 carbon atoms.

---

This is a continuation-in-part of copending U.S. patent application Ser. No. 495,695, filed Oct. 13, 1965, claiming priority of German patent application Ser. No. C 34,115 filed Oct. 16, 1964, the same claim for priority being made for the present application. Furthermore, applicant hereby claims the benefit of the filing date of German patent applications C 37,126, filed Oct. 12, 1965, and C 37,125 filed Oct. 12, 1965.

This invention relates to improvements in the properties of rubber, and in particular to the addition of N,N-substituted diamines to vulcanizable unsaturated copolymers of ethylene and an α-olefin having more than two carbon atoms.

In parent application Ser. No. 495,695 there is disclosed a group of amines which function as vulcanization activators or promoters for ultra-accelerators, and also for increasing resistance against the growth of cracks during use of the final vulcanizate.

It has now been found that certain of those amines and substituted derivatives thereof function as stabilizers as well as outstanding crack-growth-resisting agents in ehylene-α-olefin rubbers.

An object of this invention, therefore, is to provide stabilized ethylene-α-olefin rubber compositions.

Another object is to provide ethylene-α-olefin rubbers which exhibit improved resistance to crack growth.

A particular object is to provide rubbers based on terpolymers of ethylene, propylene and a polyunsaturated compound which has improved resistance to crack growth.

Upon further study of the specification and claims, other objects and advantages of the present invention will become apparent.

To attain the objects of this invention there are provided N,N-substituted diamine rubber additives of the formula:

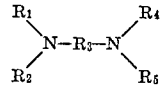

wherein
$R_1$ and $R_2$, being the same or different, represent an alkyl or hydroxyalkyl wherein the alkyl in both cases can be saturated or unsaturated,
$R_3$ represents an alkylene residue, and
$R_4$ and $R_5$ each represent hydrogen, an alkyl, or a hydroxyalkyl residue.

The alkyl, alkylene, and hydroxyalkyl residues contain 1–16, preferably 1–5, carbon atoms, e.g. methyl, pentyl dodecyl, and hexadecyl.

Particularly suitable N,N-substituted diamines include, on the one hand, N,N - dialkyl- or N,N - dialkenyl-, or N,N - dihydroxyalkyl - alkenylamines, such as, for example, N,N-diethyl-ethylenediamine,
N,N-dimethylamino-propylamine,
N,N-diethylamino-propylamine,
N,N-dimethyl-trimethylenediamine,
N,N-diethyl-trimethylenediamine,
N,N-di-n-butyltrimethylenediamine,
N,N-bis-hydroxyethyl-trimethylenediamine.

On the other hand, likewise suitable are N,N-dialkyl-, N,N-dialkenyl- and/or N,N-dihydroxyalkyl-alkylene-N'-alkylamines, such as, for example, N,N - diethyl - trimethylene - N' - propylamine, N,N - dimethyl - ethylene - N' - ethylamine, and N,N - dibutyl - trimethylene-N'-isopropylamine.

Finally, it is also possible to employ N,N-dialkyl-, N,N - dialkenyl- and/or N,N - dihydroxyalkyl - alkylene - N',N' - dialkyl-, N',N' - dialkylene-, N',N'dihydroxyalkylamines, such as, for example, N,N,N',N'-tetra (β - hydroxypropyl) - ethylenediamine.

The alkyl, alkylene, or hydroxyalkyl residues can also be exchanged in any desired manner in the above-mentioned types of compounds. Thus, suitable are, for example, N - alkyl - N - alkylene-, N-alkyl-, N-hydroxyalkyl - alkyleneamines or the substitution products thereof.

The amines can be produced by well-known procedures, as described for example in Beilstein, Handbuch der Organischen Chemie, 4. Auflage, Band IV.

By incorporating the N,N-disubstituted amines of the invention linear random vulcanizable unsaturated ethylene-α-olefin rubbers, two major problems are solved which had formerly impaired the processing, storage, and use of these rubbers.

Ethylene-α-olefin rubbers, because of their many excellent properties are particularly suitable for the production of vulcanized products which are normally subjected to dynamic stresses, such as automotive tires, conveyor belts, and drive belts. However, a problem was encountered because cracks appeared more frequently, and grew more readily than in similar articles made of the more unsaturated rubbers such as SBR. Whereas this crack developing tendency could be reduced to a certain extent by tailoring the polymer recipe to provide structurally modified polymers suitable for a specific purpose, there are restrictions which limit the applicability of tailor-made polymers. By virtue of the present invention, however, it is unnecessary to provide tailor-made structural modifications, as the incorporation of the amines of this invention leads to vulcanized products having considerably improved resistance to the growth of cracks.

Another problem solved by this invention is related to the stabilization of ethylene-α-olefin rubber against the effects of heat, light, and oxygen. Heretofore, it was a general rule that the more effective stabilizers also discolored the rubber. The amines of this invention, however, were unexpectedly found to be highly effective, non-discoloring stabilizers.

The amines of this invention are added in effective amounts for their intended function, it being preferred to add 0.05 to 5.0 parts by weight per 100 parts of rubber. They are particularly effective when used with unvulcanized, unsaturated ethylene-α-olefin rubbers which are linear random elastomeric, vulcanizable copolymers formed using a Ziegler catalyst or equivalent thereof. These copolymers comprise:

10–90, preferably 20–60 mol percent of ethylene;

10–80, preferably 40–70 mol percent of a mono-ethylenically unsaturated α-olefin of more than 2 carbon atoms, preferably 3–8 and more preferably 3–4 carbon atoms, such as, for example, propylene or α-butlyene; and 0.1 to 20, preferably 1 to 10 weight percent, based on the total terpolymer of at least one additional polymerizable polyunsaturated compound, being preferably hydrocarbon, advantageously of 4 to 30, more preferably 4 to 20 carbon atoms, and 2 to 5, preferably 2 to 3 double bonds per monomer, such as, for example, dicyclopentadiene, hexadiene-(1.5), hexadiene-(1,4), decatriene-(1,4,9), cyclooctadiene-(1,5), norborneene, as well as its alkenyl derivatives or acid addition products with polyunsaturated compounds, such as 5-methylene-norborneene, or other addition products of cyclopentadiene with unsaturated compounds. These copolymers have about 0.1 to 20 carbon-to-carbon double bonds per 1000 carbon atoms. The production of such copolymers is described in the literature, for example, U.S. Patent 3,000,866 (Aug. 26, 1959) and U.S. Patent 2,933,480 (Jan. 25, 1956).

The amines to be uptilized herein can be added to the rubber hydrocarbon, alone or together with another component of the mixture. The amines can be added, for example, during the process of forming the polymer; while the polymer is being worked up; in a separate process step before the mixture is produced; or only after other components of the composition have been admixed. The subsequent vulcanization is conducted in a conventional manner in a vulcanization equipment normally used, e.g. mold or press. However, it is also possible to utilize special vulcanization methods, such as hot-air vulcanization, continuous vulcanization (CV vulcanization), or vulcanization by the injection molding process, and other related methods. The vulcanization is preferably carried out at 140 to 200° C., more preferably 150 to 180° C.

For forming vulcanized compositions, a vulcanizing amount of a vulcanizing agent can be employed, such as sulfur, under conventional conditions, attention being directed to "Vulcanization of Elastomers," Alliger et al., Reinhold, New York, 1964, particularly pages 324–332, and more recent literature.

To obtain vulcanizates which are resistant to crack-growth, it is unnecessary to employ any special vulcanizing agent or accelerator, because those substances generally will not impair the crack-growth resistance of the compositions according to the present invention. The same holds true with the compositions set forth in parent application Ser. No. 495,695.

The amines of this invention are also useful to a finite extent as stabilizers for other polymers, e.g. styrene-butadiene rubber, polybutadiene rubber, polyisoprene rubberber, butyl rubber, polylchloroprene rubber, butadiene-acrylonitrile rubber.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

The following examples illustrate the salutary effect the amines of this invention have upon crack growth.

EXAMPLE 1

By mixing in a "Werner and Pfleiderer" masticator having a useful capacity of 2 liters, the rubber mixture (A) (standard mixture) of Table 1 is produced. The masticator temperature is 50° C. during this process, and the speed of rotation is 40 r.p.m. The vulcanizing agents are subsequently mixed into the mixture on a laboratory mill having a roller surface temperature of 50° C. In the same manner, there are produced mixtures B, C, D, E, and F, as indicated by Table 1, which differ from mixture A only in that they contain respectively 0.75 part of N,N-diethylaminopropylamine, cyclohexylethylamine, and N-phenyl-N'-isopropyl-p-phenylenediamine.

The masticated mixtures are then vulcanized at 160° C. for 90 minutes. The data listed in Table 2 are determined in accordance with the regulations set forth in the DIN standards. As can be seen from Table 2, the difference is particularly apparent in the DeMattia test when observing the crack growth.

The mixture B is outstanding in that it exhibits a considerably improved resistance to the formation of cracks upon flexing, with the outer properties only slightly changed. Further, it can be seen that the two other amines, namely cyclohexylethylamine (mixture C) and N-phenyl-N'-isopropyl-p-phenylenediamine (mixture D) exhibit a substantially lesser effectiveness with respect to the resistance to crack growth upon flexing than the substance used in mixture B.

The mixture E, with N,N-di-n-butyltrimethylenediamine, also clearly shows a substantial superiority in the resistance to crack growth upon flexing, as compared to mixtures A, C, and D.

The mixture F, with N,N-bis-hydroxyethyl-trimethylenediamine also exhibits an improvement over mixtures A, C, and D, but not as much as B and E.

TABLE 1

|  | A | B | C | D | E | F |
|---|---|---|---|---|---|---|
| Ethylene-propylene-dicyclopentadiene rubber having about 4 C-/1,000 carbon atoms, ML-4=45 | [1]100 | 100 | 100 | 100 | 100 | 100 |
| HAF (high abrasion furnace) carbon black | 50 | 50 | 50 | 50 | 50 | 50 |
| Stearic acid | 1 | 1 | 1 | 1 | 1 | 1 |
| Zinc oxide | 5 | 5 | 5 | 5 | 5 | 5 |
| Naphthenic oil | 10 | 10 | 10 | 10 | 10 | 10 |
| Sulfur | 1 | 1 | 1 | 1 | 1 | 1 |
| Tetramethylthiuram disulfide | 2 | 2 | 2 | 2 | 2 | 2 |
| N,N-diethylaminopropylamine |  | 0.75 |  |  |  |  |
| Cyclohexylethylamine |  |  | 0.75 |  |  |  |
| N-phenyl-N'-isopropyl-p-phenylenediamine |  |  |  | 0.75 |  |  |
| N,N-di-n-butyl-trimethylenediamine |  |  |  |  | 0.75 |  |
| N,N-bis-hydroxyethyltrimethylenediamine |  |  |  |  |  | 0.75 |

[1] Numerical values in parts by weight.

Vulcanization in Compression Mold at 160° C. for 90 minutes.

TABLE 2

| Mixture of Table 1: | Number of strokes for reaching a crack widening from 2 to 20 mm. in a DeMattia machine [1] |
|---|---|
| A | 10,000 |
| B | >100,000 |
| C | 23,000 |
| D | 13,000 |
| E | 52,000 |
| F | 26,000 |

[1] According to DIN (German Industry Standard) 53,522.

The following examples illustrate the beneficial effect of the amines of this invention when they are employed as stabilizers.

EXAMPLE 2

For determining the effect of various stabilizers, a recent model of a Brabender plastograph is employed, having a continuous recording device for measuring torque. The kneading assembly used in this connection has a capacity of 75 cm.³ and is provided with a piston. The two kneading arms, provided with cams, can have their rotational velocity varied. The test conditions are as follows:

Extent to which the kneader is filled _____ 0.8
Temperature in the kneader _____ °C__ 190
Revolutions per minute _____ 120
Filling time of the kneader, 1 minute For these tests, an unsaturated ethylene-propylene rubber having a propylene content of about 45% by weight is employed which has dicyclopentadiene as the tercomponent. The degree of unsaturation is about 8 double bonds per 1000 carbon atoms. If this rubber is treated, under the above-mentioned test conditions, in the Brabender kneader, there is obtained, in addition to the first maximum at the beginning of the kneading procedure, a second maximum torque after about 20 minutes. This second maximum is produced by the cross-linking reactions taking place in this process. The chronological position of the maximum represents a measure of the thermal stability of the rubber, and is dependent, in this connection, upon the unsaturation of the rubber. This latter fact is demonstrated by Table 3 wherein extraordinarily short periods of time for reaching the second maximum are shown for the polydiene rubbers. By the addition of known stabilizers, or agents affording protection against ageing, of the phenolic as well as the amine type, the period for attaining the second maximum can be substantially extended. Table 4 shows the effect of various stabilizers, not of this invention, which are added in amounts of 0.25 and 1.0 part by weight per 100 parts by weight of rubber.

It can be seen from the above that the effectiveness of the stabilizer is dependent upon the quantity of stabilizer employed. The most favorable ones are the strongly discoloring p-phenylenediamine derivatives.

Finally, Table 5 shows the particular stabilizing effect of representative amines of this invention, experiments 3, 4, and 5 showing N,N-diethylethylenediamine, N,N-dimethyltrimethylenediamine, and N,N-diethylaminopropylamine, respectively. It is seen from Table 5 that at low concentrations of stabilizer, i.e., below 0.2 part by weight, based on 100 parts by weight of rubber, the effectiveness of the amines of this invention is equal to or better than even the strongly discoloring stabilizers of the prior art. Because the amines of this invention are substantially devoid of discoloring properties, an important advantage is gained in their use when color of the product is an important consideration.

Combined beneficial properties of excellent stabilizing effect (especially good for prolonged storage) and lack of discoloring effect are also found with the other members of the N,N-disubstituted diamines of this invention, but the three tabulated amines in experiments 3, 4, and 5 of Table 5 are preferred. It is further to be noted that the amine of experiment 5, N,N-diethylaminopropylamine, not only is an effective non-discoloring stabilizer, but it also imparts an outstanding resistance to crack growth in the resultant vulcanizates.

TABLE 3

| No. | Rubber type | Stabilizer [1] | Period from start of kneading treatment to attainment of 2d maximum of torque (viscosity), minutes |
|---|---|---|---|
| I | Unsaturated ethylene-propylene rubber ca. 8 C=/1,000 C atoms. | No stabilizer | ca. 20 |
| II | Unsaturated ethylene-propylene rubber ca. 2 C=/1,000 C atoms. | ____do____ | >45 |
| III | Butadiene-styrene rubber, type 1500. | 1.25 parts by weight of phenyl-β-naphthylamine. | ca. 3 |
| IV | Polybutadiene rubber, ca. 98% cis-proportion. | ____do____ | ca. 2.5 |

[1] Parts by weight of stabilizer per 100 parts by weight of rubber. Mooney viscosity for I, II, III, and IV: ML–4=45–55. Unsaturated component for I, and II: Dicyclopentadiene. Propylene content for I and II: ca. 40% by weight.

TABLE 4

| Rubber type | Type of stabilizer | Period from start of kneading treatment to attainment of 2d maximum of torque (viscosity) | |
|---|---|---|---|
| | | 1.0 part of stabilizer (minutes) | 0.25 part of stabilizer (minutes) |
| Unsaturated ethylene-propylene rubber [1] ca. 8 C=/1,000 C atoms. | Mercaptobenzimidazole.[2] | 24 | ca. [3] 20 |
| Do | Laurylamine [2] | >45 | 28 |
| Do | Cyclohexylethylamine.[2] | >45 | 30 |
| Do | Phenyl-β-naphthylamine.[4] | >45 | 33 |
| Do | Aldol-α-naphthylamine.[4] | >45 | 38 |
| Do | Di-β-naphthyl-p-phenylenediamine.[4] | >45 | >45 |
| Do | N-phenyl-N'-isopropyl-p-phenylenediamine.[4] | >45 | >45 |

[1] Mooney viscosity ML–4: 45–55. Unsaturated component: Dicyclopentadiene. Propylene content: ca. 40% by weight.
[2] Non-discoloring.
[3] I.e., practically identical with the value for the unstabilized rubber I in Table 3.
[4] Discoloring.

TABLE 5

| Exp. No. | Rubber type | Type of stabilizer | Period from start of kneading treatment to attainment of 2nd maximum of torque (viscosity) | |
|---|---|---|---|---|
| | | | 1.0 part of stabilizer (minutes) | 0.1 part of stabilizer (minutes) |
| 1 | Unsaturated ethylene-propylene rubber ca. 8 C=/1,000 C atoms.[1] | Bi-β-naphthyl-p-phenylenediamine [1] | >45 | 35 |
| 2 | do | N-phenyl-N'-isopropyl-p-phenylenediamine.[2] | >45 | >45 |
| 3 | do | N,N-diethylethylenediamine.[3] | >45 | >45 |
| 4 | do | N,N-dimethyltrimethylenediamine.[3] | >45 | >45 |
| 5 | do | N,N-diethylaminopropylamine.[3] | >45 | >45 |

[1] Mooney viscosity ML–4: 45–55. Unsaturated component: Dicyclopentadiene. Propylene content: ca. 40% by weight.
[2] Discoloring.
[3] Non-discoloring.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A vulcanizable composition comprising an unsaturated linear random copolymer of ethylene, an α-ethylenically unsaturated monoolefin of more than 2 carbon atoms, and, based on the weight of the copolymer, about 0.1–20% by weight of an unconjugated polyunsaturated hydrocarbon; and about 0.05 to 5.0 parts by weight, based on 100 parts by weight of said copolymer of a compound of the formula:

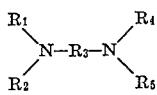

wherein
$R_1$ and $R_2$ each represents alkyl, or hydroxyalkyl of 1–16 carbon atoms,
$R_3$ represents alkylene of 1–16 carbon atoms, and
$R_4$ and $R_5$ each represents hydrogen, alkyl of 1–16 carbon atoms, or hydroxyalkyl of 1–16 carbon atoms.

2. A composition as defined by claim 1 wherein the copolymer is comprised of 10–90 mol percent of ethylene, 10–80 mol percent of an α-monoolefin of 3–8 carbon atoms, and 0.1 to 20% by weight, based on the weight of the copolymer, of an unconjugated polyunsaturated hydrocarbon of 4–30 carbon atoms and 2–5 double bonds.

3. A composition as defined by claim 1 wherein said compound is N,N-diethyl-ethylenediamine, N,N-dimethylaminopropylamine, N,N-diethylaminopropylamine, N,N-dimethyltrimethylenediamine, N,N - diethyl-trimethylenediamine, N,N-dibutyl-trimethylenediamine, N,N - bis-hydroxyethyl-trimethylenediamine, N,N - diethyl-trimethylene-N'-propylamine, N,N-dimethylethylene - N' - ethyl-amine, and N,N-dibutyl-trimethylene-N'-isopropylamine, and N,N,N',N'-tetra(β-hydroxypropyl)-ethylenediamine.

4. A composition as defined by claim 2 wherein said compound is N,N-diethylaminopropylamine, and the α-monoolefin is propylene.

5. A rubber composition comprising a vulcanizing amount of a vulcanizing agent and an unsaturated linear random copolymer of ethylene, an α-ethylenically unsaturated monoolefin of more than 2 carbon atoms, and, based on the weight of the copolymer, about 0.1–20% by weight of an unconjugated polyunsaturated hydrocarbon; and about 0.05 to 5.0 parts by weight, based on 100 parts by weight of said copolymer of a compound of the formula:

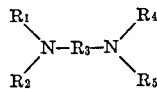

wherein
$R_1$ and $R_2$ each represents alkyl, or hydroxyalkyl of 1–16 carbon atoms,
$R_3$ represents alkylene of 1–16 carbon atoms, and
$R_4$ and $R_5$ each represents hydrogen, alkyl of 1–16 carbon atoms, or hydroxyalkyl of 1–16 carbon atoms.

6. A rubber composition as defined by claim 5 wherein the copolymer is comprised of 10–90 mol percent of ethylene, 10–80 mol percent of an α-monoolefin of 3–8 carbon atoms, and 0.1 to 20% by weight, based on the weight of the copolymer, of polyunsaturated hydrocarbon of 4–30 carbons and 2–5 double bonds.

7. A rubber composition as defined by claim 5 wherein said compound is

N,N-dimethyl-ethylenediamine,
N,N-dimethyl-aminopropylamine,
N,N-diethylaminopropylamine,
N,N-dimethyl-trimethylenediamine,
N,N-diethyltrimethylenediamine,
N,N-dibutyl-trimethylenediamine,
N,N-bis-hydroxyethyl-trimethylenediamine,
N,N-diethyltrimethylene-N'-propylamine,
N,N-dimethyl-ethylene-N'-ethylamine, and
N,N-dibutyl-trimethylene-N'-isopropylamine, and
N,N,N',N'-tetra(β-hydroxypropyl)-ethylenediamine.

8. A rubber composition as defined by claim 6 wherein said compound is N,N-diethylaminopropylamine, and the α-monoolefin is propylene.

9. A process for stabilizing and increasing the crack growth resistance of an unsaturated linear random copolymer of ethylene, an α-ethylenically unsaturated monoolefin of more than 2 carbon atoms, and based on the weight of the copolymer about 0.1–20% by weight of an unconjugated polyunsaturated hydrocarbon; the improvement comprising vulcanizing said copolymer in the presence of about 0.05–5.0 parts by weight, based on 100 parts by weight of said copolymer of a compound of the formula:

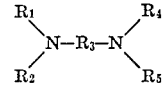

wherein
$R_1$ and $R_2$ each represents alkyl, or hydroxyalkyl of 1–16 carbon atoms,
$R_3$ represents alkylene of 1–16 carbon atoms, and
$R_4$ and $R_5$ each represents hydrogen, alkyl of 1–16 carbon atoms, or hydroxyalkyl of 1–16 carbon atoms.

10. A process as defined by claim 9 wherein said copolymer is comprised of 10–90 mol percent of ethylene, 10–80 mol percent of an α-monoolefin of 3–8 carbon atoms, and 0.1 to 20% by weight, based on the weight of the copolymer, of an unconjugated polyunsaturated hydrocarbon of 4–30 carbon atoms and 2–5 double bonds.

11. A process as defined by claim 9 wherein said compound is

N,N-diethyl-ethylenediamine,
N,N-dimethylaminopropylamine,
N,N-diethylaminopropylamine,
N,N-dimethyl-trimethylenediamine,
N,N-diethyltrimethylenediamine,
N,N-dibutyl-trimethylenediamine,
N,N-bis-hydroxyethyl-trimethylene-diamine,
N,N-diethyltrimethylene-N'-propylamine,
N,N-dimethyl-ethylene-N'-ethylamine, and
N,N-dibutyl-trimethylene-N'-isopropylamine, and
N,N,N',N'-tetra(β-hydroxypropyl)-ethylenediamine.

12. A process as defined by claim 10 wherein said compound is N,N-diethylaminopropylamine, and the α-monoolefin is propylene.

References Cited

UNITED STATES PATENTS

| | | | |
|---|---|---|---|
| 2,878,232 | 3/1959 | Schweitzer | 260—45.9 |
| 2,939,867 | 6/1960 | Ambelang | 260—79.5 |
| 3,260,708 | 7/1966 | Natta et al. | 260—79.5 |

JAMES SEIDLECK, *Primary Examiner.*

U.S. Cl. X.R.
260—23.7, 79.5

UNITED STATES PATENT OFFICE
CERTIFICATE OF CORRECTION

Patent No. 3,436,370      Dated     April 21, 1970

Inventor(s)   Harald Blumel

It is certified that error appears in the above-identified patent and that said Letters Patent are hereby corrected as shown below:

IN THE SPECIFICATION:

Column 1, line 57:   change "ehylene" to --ethylene--.

Column 2, line 38:   change "N',N' dihy" to --N',N'-dihy--.

Column 3, line 22:   change "butlyene" to --butylene--.

Column 3, line 29:   change "(1.5)" to --(1,5)--.

Column 3, Line 38:   change "Aug. 26, 1959" to --Oct. 26, 1959--.

Column 3, line 41:   change "uptilized" to --utilized--.

Column 3, line 72:   change "berber" to --ber--.

Column 6, line 53:   change "Bi-β-naphthyl-p-" to --Di-β-naphthyl-p---.

IN THE CLAIMS:

Claim 11, line 54:   delete "and".

Signed and sealed this 15th day of September 1970.

(SEAL)
Attest:

EDWARD M. FLETCHER, JR.
Attesting Officer

WILLIAM E. SCHUYLER, JR.
Commissioner of Patents